Nov. 5, 1957          J. J. CHYLE          2,812,419
WELDING PROCEDURE FOR JOINING ALUMINUM PLATES
Filed Sept. 29, 1955
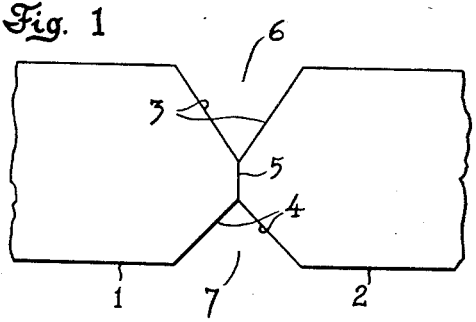
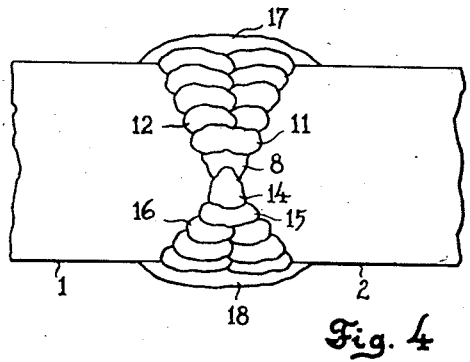
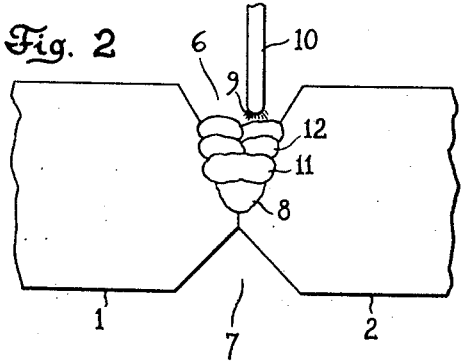
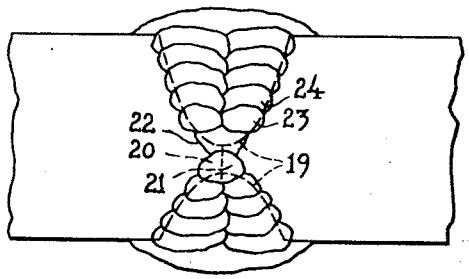
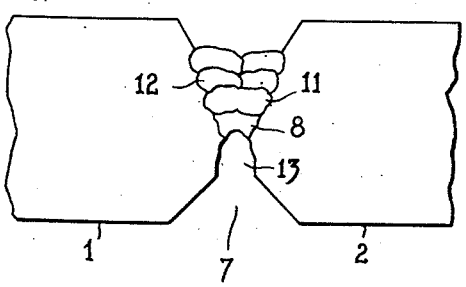
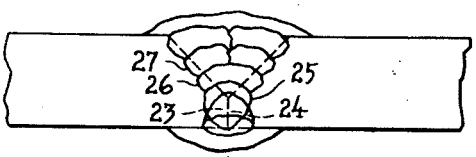
INVENTOR:
John J. Chyle
by Andrus & Scales
Attorney _United States Patent Office_

2,812,419
Patented Nov. 5, 1957

2,812,419
WELDING PROCEDURE FOR JOINING ALUMINUM PLATES

John J. Chyle, Wauwatosa, Wis., assignor to A. O. Smith Corporation, Milwaukee, Wis., a corporation of Wisconsin Application September 29, 1955, Serial No. 537,353

11 Claims. (Cl. 219—118)

This invention relates to the arc welding of a thick section of an aluminum alloy and particularly a high strength or heat treated aluminum alloy.

Satisfactory welding of aluminum alloy is generally limited to thickness of three quarters of an inch and less. In thick members the strength of the welded joint is normally insufficient for the usage which requires the thick member.

The present invention provides a procedure by the use of a multilayer weld for satisfactorily welding aluminum members regardless of the thickness of the members.

Generally, in accordance with the present invention, a welding groove is formed by the adjacent aluminum edges to be welded. A dam is formed in the groove to support the first layer or bead of weld metal deposited. The first pass is made with a relatively high silicon aluminum alloy filler-wire or electrode and subsequent passes are made with a magnesium-manganese-aluminum alloy filler-wire or electrode.

In welding edges which have a thickness greater than one-half inch, a double groove preparation having the one groove somewhat deeper than the opposed groove is normally used. When using a double groove preparation, the first layer or deposit of weld metal is in the deeper groove. Then, at least two layers of the second type filler metal is deposited in the deeper groove after which the unfused portion of the dam or root edges of the back-to-back grooves is removed and the shallow groove is at least partially filled with weld metal. Thereafter, the grooves are filled with the second filler metal.

To complete the weld joint, a final reinforcement weld bead overlaying the weld area and joining the base metal is deposited over each groove area.

In the drawing:

Figure 1 is a cross-sectional view of adjoining edges of two aluminum plates to be arc welded together;

Fig. 2 is a view similar to Figure 1 with the edges partially welded together;

Fig. 3 is a view of the edges of Fig. 2 with the root edge or dam removed;

Fig. 4 is a view, in section, showing a completed joint;

Fig. 5 is a view similar to Fig. 3 of a completed weld with a different groove preparation; and Fig. 6 is a view similar to Fig. 4 of a relatively thin aluminum weld with a single groove preparation.

Referring to the drawing and particularly to Figure 1 thereof, in accordance with one embodiment of the present invention, a pair of aluminum plates 1 and 2 are placed in edge-to-edge relation with the edges to be joined by welding being provided with chamfered converging surfaces 3 and 4 to form a generally blunted or vertical surface 5.

The aluminum plates 1 and 2 are aluminum base alloys such as a magnesium-aluminum alloy and a copper-magnesium-aluminum alloy. A specific example in weight percentages of a copper-magnesium-aluminum alloy which has been used is as follows:

| | Percent |
|---|---|
| Copper | 4.44 |
| Silicon | 0.02 |
| Manganese | 0.65 |
| Magnesium | 1.62 |
| Iron | .26 |
| Aluminum | Balance |

And, an example in weight percentages of a magnesium-aluminum alloy is as follows,

| | Percent |
|---|---|
| Manganese | 0.10 |
| Magnesium | 4.76 |
| Chromium | 0.13 |
| Aluminum | Balance |

The aluminum plates are placed with the vertical surfaces 5 in abutting relation. As a result, a welding scarf design or edge preparation of the double V groove type is formed by the converging surfaces 3 and 4, with grooves 6 and 7 in the respective upper and lower planes of the plates' surfaces, as shown in Figure 1 of the drawing.

The upper groove 6 is somewhat deeper than the opposed lower groove 7. Consequently, as shown in Fig. 2, a first layer or bead of filler metal 8 which is deposited in the upper groove 6 is located generally midway between the plates' surfaces and excessive bowing is prevented, as more fully described hereinafter.

The arc subtended by the converging surfaces of the lower or shallow groove 7 is greater than that of the upper groove 6. This facilitates removal of the unfused portion of the dam formed by the abutting surfaces 5, as hereinafter described, by providing easier access thereto.

As previously noted, the first pass is made to deposit the first layer of weld metal 8 in the base of the deeper groove 6.

The weld metal is deposited by any suitable welding means such as a consumable electrode process wherein the electrode is deposited within the groove and fuses with the adjacent surfaces. Thus, the first layer or weld bead 8 is formed in the same manner as for subsequent layers one of which is shown in Fig. 2 as being deposited by establishment of an arc 9 between a consumable electrode or weldrod 10 and the adjacent parent metal and previously deposited weld metal.

The first deposited metal or weld bead 8 fuses with the converging surfaces of the groove 6 and the dam or base of the groove to form an integral structure therewith.

The weldrod for the first or initial pass is a silicon-aluminum alloy filler metal. The use of this type of filler was found to be necessary to prevent development of cracks in the weld.

For subsequent passes, the weldrod is a magnesium-manganese-aluminum filler metal.

The silicon-aluminum alloy used in the first pass or deposit is composed, by weight of the following:

| | Percent |
|---|---|
| Silicon | 4.0 to 12 |
| Iron | .1 to 5 |
| Aluminum | Balance |

A specific example in weight percentages of the silicon-aluminum alloy is composed of the following:

| | Percent |
|---|---|
| Silicon | 4.95 |
| Iron | .47 |
| Aluminum | Balance |

The magnesium-manganese-aluminum alloy filler wire is selected from the group of alloys consisting, by weight, of:

(a)

| | Percent |
|---|---|
| Copper | 3.5 to 5.5 |
| Silicon | 0.1 to 0.5 |
| Manganese | .1 to .7 |
| Magnesium | .1 to .8 |
| Iron | .01 to .7 |
| Aluminum | Balance |

(b)

| | |
|---|---|
| Silicon | .01 to 5 |
| Manganese | .1 to .5 |
| Magnesium | 4.5 to 6 |
| Chromium | .01 to .5 |
| Iron | .01 to .7 |
| Aluminum | Balance |

Three specific examples, in weight percentages, of a magnesium-manganese-aluminum alloy of the preceding group (a) are:

| | Copper | Silicon | Manganese | Magnesium | Iron | Aluminum |
|---|---|---|---|---|---|---|
| 1 | 4.34 | 0.35 | 0.53 | 0.71 | 0.57 | Balance. |
| 2 | 4.30 | 0.47 | 0.56 | 0.76 | 0.61 | Do. |
| 3 | 4.14 | 0.51 | 0.57 | 0.71 | 0.56 | Do. |

Three specific examples, in weight percentages, of a magnesium-manganese aluminum alloy of the preceding group (a) and having a larger percentage of magnesium than the previous specific examples are:

| | Copper | Silicon | Manganese | Magnesium | Iron | Aluminum |
|---|---|---|---|---|---|---|
| 1 | 4.46 | 0.20 | 0.44 | 1.44 | 0.39 | Balance. |
| 2 | 4.5 | 0.50 | 0.50 | 1.50 | 0.50 | Do. |
| 3 | 4.30 | 0.13 | 0.63 | 1.46 | 0.01 | Do. |

Three specific examples of a magnesium-manganese-aluminum alloy of the preceding group (b) are:

| | Silicon | Manganese | Magnesium | Chromium | Iron | Aluminum |
|---|---|---|---|---|---|---|
| 1 | 0.11 | 0.11 | 5.40 | 0.08 | 0.44 | Balance. |
| 2 | 0.30 | 0.15 | 5.20 | 0.10 | 0.40 | Do. |
| 3 | 0.07 | 0.11 | 5.10 | 0.01 | 0.23 | Do. |

In filling the grooves with the magnesium-manganese-aluminum weldrod, the first two lamina 11 and 12 thereof are deposited in the deeper groove 6 upon the first weld layer 8. As shown in Fig. 2, the second weld layer 11 is formed by a single weld bead or pass of the electrode 10 and the bead corresponds to the first layer 8. The third weld layer 12 is formed of side-by-side weld beads which interfuse with each other as well as with the adjacent base metal or plates and the second layer of weld metal. The side-by-side weld beads are employed because of the increased distance between the converging side walls of groove 8.

Rather than describe each layer of filler metal after the first pass by setting forth a specific example, each is broadly described as formed by the deposit of a magnesium-manganese-aluminum alloy. Normally, the particular magnesium-manganese-aluminum alloy used as filler metal is of the same composition for all subsequent passes.

After the third layer 12 is deposited, the base of the undergroove 7 formed by the unfused portion of the dam is removed in any suitable manner to form a recess 13, as shown in Fig. 3. Chipping is a satisfactory method of removal.

Then, three layers 14, 15 and 16 of the magnesium-manganese-aluminum alloy filler metal are successively deposited within the undergroove 7 to counteract the bowing forces set up by the cooling and resultant contracting of the filler metal previously deposited in the upper groove 6. Thereafter, the grooves 6 and 7 are filled to complete the weld with a series of layers of filler metal, of the noted magnesium-manganese-aluminum alloy, alternately deposited, one or more layers in each groove. This procedure is preferred as the bowing forces set up by the latter layers of filler metal will then counteract each other.

To increase the tensile strength of the weld joint, each layer or bead of filler metal is peened while it is in a molten or plastic state. Any suitable means, not shown, mechanical or manual, may be used to peen the weld. The peening prevents cracking of the weld, apparently through a reduction in the large columnar grain structure of the weld and also by relieving the stresses in the weld.

The final weld is further increased in strength by depositing a single overlaying bead of magnesium-manganese-aluminum alloy filler metal 17 and 18 over each weld. This apparently causes a further redistribution of the stresses in the weld area and thereby increases the joint strength.

It was found that the joint strength was also increased if the plates were preheated when a consumable electrode arc welding process, as described, was used. On the other hand, preheating did not noticeably affect the joint strength when a tungsten-arc process was used.

Although a double V type preparation is illustrated in Figs. 1–4, any other double groove type preparation is also suitable.

For example, in Fig. 5 a double U type groove preparation is illustrated. This preparation, shown in dotted lines, is similar to the double V type except that a broader base is provided due to the curve 19 of the lower part of the edges of abutting lips 20 and 21 forming the grooves. As in the prior embodiment, three layers of weld metal are deposited in the deeper of the back-to-back grooves. The first layer 22 is made with a silicon-aluminum filler metal and the second and third layers 23 and 24 are made with a magnesium-manganese-aluminum filler metal. Due to the rapidly increasing distance between the adjacent edges, the second layer 23 is formed of side-by-side weld beads.

Subsequently, the unfused portion of the dam, formed by the touching lips 20 and 21, is removed and a series of layers of magnesium-manganese-aluminum filler metal, as previously described, is deposited in the second groove.

Although the double groove preparations having integrally formed lips to provide a dam for the deposited metal are shown, a separate horizontal plate arranged between the edges to form a dam is also within the scope of the present invention.

Further, even though a double groove preparation is preferred, a single groove type preparation can be employed. This is particularly true of aluminum plates of a relatively small thickness.

An example of a pair of aluminum plates joined in accordance with the present invention wherein a single groove preparation is used is shown in Fig. 6. A single V groove is shown, in dotted lines, having a base or dam thereof which is formed by touching lips 23 and 24 in the lower plane of the aluminum plates to be welded together.

As in the prior embodiments shown, a first layer 25 is formed by depositing within the groove a filler metal of the silicon-aluminum alloy previously set forth. Then a second and a third layer, 26 and 27, respectively, is formed by depositing upon the first layer 25 a filler metal of the magnesium-manganese-aluminum alloy previously described. Thereafter, the dam is removed and the groove so formed is filled with a filler metal of the type which forms the second and third layers 26 and 27.

The present invention provides a welded joint in a heat treated aluminum alloy which is free of cracks and other serious defects with a resulting increased joint efficiency. The present invention further discloses a procedure which results in the successful welding of a copper-magnesium-aluminum alloy having the properties of the parent metal in the weld area.

Various modes of carrying out the invention are contemplated as being within the scope of the following claims particularly pointing out and distinctly claiming the subject matter which is regarded as the invention.

I claim:

1. In the process of joining the adjacent edges of two high strength aluminum alloy articles by a multilayer weld, the steps which comprise providing between the edges a welding groove having a dam to support a first deposit of filler metal; fusing in the groove a first layer of filler metal consisting essentially by weight of 4.0% to 12.0% silicon, 0.1% to 0.5% iron and the balance aluminum; and fusing at least a second layer of filler metal selected from the group consisting of an alloy composed essentially by weight of 3.5% to 5.5% copper, 0.1% to 0.5% silicon, 0.1% to 0.7% manganese, .1% to 2% magnesium, .1% to .7% iron, and the balance aluminum and an alloy composed essentially by weight of 0.1% to 0.5% silicon, 0.1% to 0.5% manganese, 4.5% to 6.0% magnesium, 0.1% to 0.5% chromium, and the balance aluminum.

2. The process of claim 1 having the first named filler metal consisting by weight of 4.95% silicon, 0.47% iron, and the balance aluminum.

3. The process of claim 1 having the second named filler metal consisting by weight of 4.34% copper, 0.35% silicon, 0.53% manganese, 0.71% magnesium, 0.57% iron, and the balance aluminum.

4. The process of claim 1 having the second named filler metal consisting by weight of 4.30% copper, 0.47% silicon, 0.56% manganese, 0.76% magnesium, 0.61% iron, and the balance aluminum.

5. The process of claim 1 having the second named filler metal consisting by weight of 4.14% copper, 0.51% silicon, 0.57% manganese, 0.71% magnesium, 0.56% iron, and the balance aluminum.

6. In a process of arc welding a heat treated copper-magnesium-aluminum alloy, the steps which comprise forming the adjoining surfaces into a groove having an intermediate dam, fusing in the groove a first layer of filler metal consisting essentially by weight of 4.0% to 12.0% silicon, 0.1% to 0.5% iron and the balance aluminum; and fusing at least a second layer of filler metal selected from the group consisting of an alloy composed essentially by weight of 3.5% to 5.5% copper, 0.1% to 0.5% silicon, 0.1% to 0.7% manganese, .1% to 2% magnesium, .1% to .7% iron, and the balance aluminum and an alloy composed essentially by weight of 0.1% to 0.5% silicon, 0.1% to 0.5% manganese, 4.5% to 6.0% magnesium, 0.1% to 0.5% chromium, and the balance aluminum.

7. In the process of joining the adjacent edges of two heat treated aluminum alloy articles by a multilayer weld, the steps which comprise providing between the edges a welding groove having a dam to support a first deposit of filler metal; fusing in the groove a first layer of filler metal consisting by weight of 4.0% to 12.0% silicon, 0.1% to 0.5% iron and the balance aluminum; and fusing at least a second layer of filler metal consisting by weight of 3.5% to 5.5% copper, 0.1% to 0.5% silicon, 0.1% to 0.7% manganese, .1% to 2% magnesium, .1% to .7% iron, and the balance aluminum.

8. In the process of joining the adjacent edges of two heat treated aluminum alloy articles by a multilayer weld, the steps which comprise providing between the edges a welding groove having a dam to support a first deposit of filler metal; fusing in the groove a first layer of filler metal consisting by weight of 4.0% to 12.0% silicon, 0.1% to 0.5% iron and the balance aluminum; and fusing at least a second layer of filler metal consisting by weight of 0.1% to 0.5% silicon, 0.1% to 0.5% manganese, 4.5% to 6.0% magnesium, 0.1% to 0.5% chromium, and the balance aluminum.

9. In the process of joining adjacent edges of thick, heat treated aluminum with a multilayer weld, the steps which comprise shaping the edges to form a double groove preparation having a dam therein; fusing in one of the grooves a first layer of filler metal consisting by weight of 4 to 12% silicon, .1% to .5% iron and the balance aluminum; fusing upon the first layer a second and a third layer of filler metal selected from the group consisting of an alloy composed by weight of 3.5% to 5.5% copper, .1% to .5% silicon, .1% to .7% manganese, .1% to .2% magnesium, .1% to .7% iron and the balance aluminum and an alloy composed by weight of .1% to .5% silicon, .1% to .5% manganese, 4.5% to 6% magnesium, .1% to .5% chromium and the balance aluminum; removing the unfused portion of the dam; fusing at least one layer of filler metal selected from said group in the second groove; and fusing additional layers of filler metal selected from said group in said grooves to fill the grooves.

10. In the process of joining abutting edges of heat treated aluminum by a multilayer weld, the steps which comprise forming the edges to a double V groove preparation having a dam which is offset to form a deep and a shallow groove; fusing in the deep groove a first layer of filler metal composed by weight of 4% to 12% silicon, .1% to .5% iron and the balance aluminum; fusing a second layer of filler metal selected from the group consisting of an alloy composed by weight of 3.5% to 5.5% copper, 1% to .5% silicon, .1% to .7% manganese, .1% to 2% magnesium, 1% to .7% iron, and the balance aluminum and an alloy composed by weight of .1% to .5% silicon, .1% to .5% manganese, 4.5% to 6% magnesium, .1% to .5% chromium, and the balance aluminum; fusing a third layer of filler metal selected from said group and formed of side-by-side weld deposits; removing the unfused portion of the dam from the base of the shallow groove; fusing a layer of filler metal selected from said group; and fusing additional layers of filler metal selected from said group in the grooves to fill the grooves, said last named layers being deposited by side-by-side weld deposits when a single deposit fails to join with both edges.

11. In the process of claim 10 the additional step which comprises fusing to each surface of the weld area a single bead reinforcing weld deposit selected from said group so as to overlay the weld area and fuse to the heat treated aluminum.

References Cited in the file of this patent

UNITED STATES PATENTS

| 1,812,123 | Stresau | June 30, 1932 |
| 1,869,667 | Churchward | Aug. 2, 1932 |
| 2,237,716 | Spaulding | Apr. 8, 1941 |
| 2,329,410 | Morrison | Sept. 14, 1943 |